Nov. 7, 1967  F. E. STUART, SR  3,351,292
NOZZLE DISCHARGE CAP
Filed Jan. 26, 1966
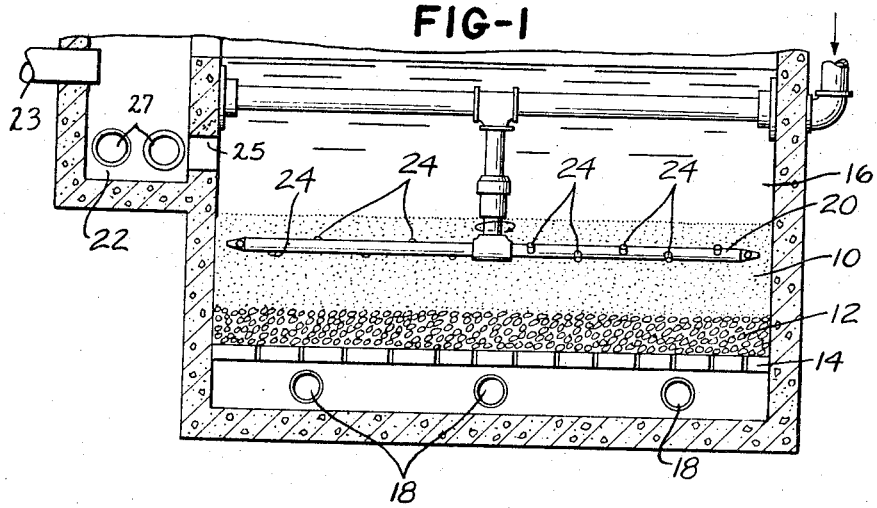
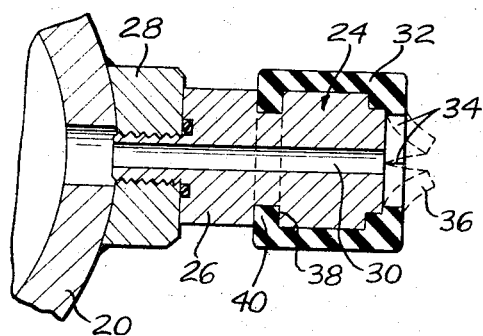
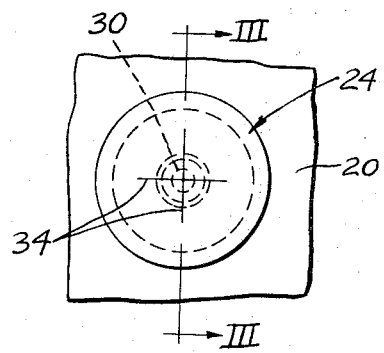
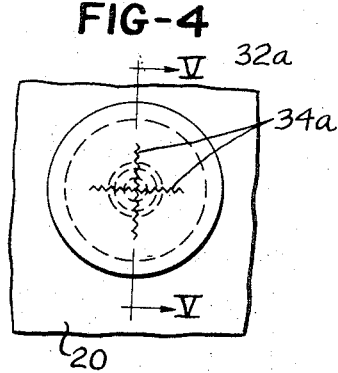
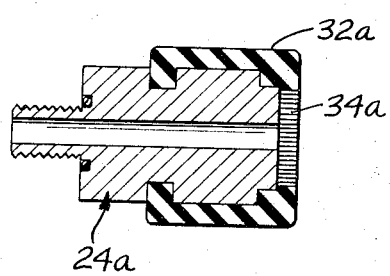
INVENTOR.
FRED E. STUART
BY
Melvin A. Crosby 3,351,292
NOZZLE DISCHARGE CAP
Fred E. Stuart, Sr., Baltimore, Md.
(523 N. Grandview Ave., Daytona Beach, Fla. 32018)
Filed Jan. 26, 1966, Ser. No. 523,068
6 Claims. (Cl. 239—534)

The present invention relates to a nozzle arrangement particularly adapted for use with fluid treatment systems such as aerating systems and filter backwashing devices and is especially concerned with a nozzle arrangement for such systems in which the ingress of liquid or sand or "Anthrafilt" or the like into the supply pipes for the nozzles is prevented. The present invention is also concerned with the provision of a nozzle arrangement in which air supplied for some particular reason to a body of fluid will be broken up into fine bubbles so as to be more effective for treatment of the liquid.

The provision of backwashing devices for sand or "Anthrafilt" filters and the like are known. With such an arrangement a body of sand or other granular material is provided through which liquid, such as water or processed sewage, to be filtered is passed so that solids contained in the liquid will be trapped by the sand, or "Anthrafilt" or other filter media.

Periodically, filter beds of this nature are backwashed to loosen up the sand, "Anthrafilt" or other granular material and also to flush away the solids entrapped therein. For effecting the backwashing, supply pipes are provided having nozzles thereon through which the backwashing water and/or air is supplied. These pipes may be in the form of rotating heads or the like and are provided with nozzles distributed therealong through which the water and/or air issues.

It will be evident that, when backwashing is not in progress, the possibility exists of getting the sand or granular material into the pipes unless the nozzle openings are so small as to prevent grains of sand or "Anthrafilt" or other granular material from entering the nozzle openings. It is impractical to make the nozzle openings small enough to prevent sand and or other granular material from entering because, in the operation of filtering and backwashing the sand and or other material sometimes becomes abraded and broken up into extremely fine particles.

The present invention has a particular object the provision of a simple device for absolutely preventing sand or other foreign matter from getting into the supply pipes through the nozzle openings while at the same time not restricting the nozzle openings from the passing of the backwashing water or treatment liquid therethrough.

In other instances, it is sometimes desirable to treat a body of liquid by supplying a gas such as air thereto. This can occur in connection with sewage treatment and the like, for example. In such instances a similar set up is arranged with supply pipes or conduits being provided and which pipes or conduits are provided with nozzles through which the air or other gas issues to come into contact with the liquid to be treated. When the air or gas is to effect treament of the liquid it is important, of course, for intimate contact to be established between the liquid and the gas. To this end, it is preferable for the gas or air to be supplied in the form of extremely fine bubbles which will provide the greatest area of contact between the air or gas and the liquid. It is also desirable for the liquid to be prevented from entering the supply pipe or conduit via the nozzles and accordingly, in addition to breaking up the gas or air into extremely fine bubbles, it is desirable to block off the nozzles when the supply of air or gas is interrupted for any reason, such as power failure.

With this in mind, the present invention has as a further object the provision of a nozzle arrangement for blow pipes and the like in which the gas or air being supplied through the nozzle is broken up into a plurality of extremely fine bubbles while at the same time reverse flow of liquid through the nozzle is prevented.

A still further object is the provision of a cap element or the like which can be mounted on a nozzle, such as the nozzle on a backwash pipe or agitator in a filter bed, or on the nozzle of a blow pipe or agitator for treatment of a body of liquid, in which one way flow in the direction outwardly, or alternately, upward and downward is permitted through the pertaining nozzle or nozzles.

The several features of the present invention and the foregoing objects as well as still other objects and advantages thereof will become more apparent upon reference to the following detailed specification taken in connection with the accompanying drawings in which:

FIGURE 1 is somewhat schematic sectional view through a typical filter bed arrangement showing a backwashing system having nozzles on the supply pipe or rotating agitator according to the present invention;

FIGURE 2 is a view looking in at the end of one of the nozzles and drawn at enlarged scale;

FIGURE 3 is a vertical sectional view indicated by line III—III on FIGURE 2;

FIGURE 4 is a view similar to FIGURE 2 but showing a modification: and

FIGURE 5 is a vertical sectional view indicated by line V—V on FIGURE 4.

Referring to the drawings somewhat more in detail, the arrangement shown in FIGURE 1 illustrates a filter bed 10 of sand or "Anthrafilt" or granular material which may be supported on relatively coarse aggregate 12 resting on porous block means 14 or other type filter under drain system. The filtered liquid, usually water, is delivered by conduit 23 to the chamber 22 whence it flows by way of passage 25 to region 16 above the filter bed and then through the filter media to conduit means 18 and therethrough to a point of use. Disposed within the bed 10 of granular material are supply conduit means 20 which can be rotatable, if desired, but which may, on the other hand, be stationary if so desired. These conduit means are for the purpose of supplying water for loosening up the bed 10 of granular material while causing reverse flow of liquid therethrough to wash away foreign matter. The backwash water and foreign matter will flow out to chamber 22 via passage 25 and discharge therefrom through conduits 27, according to well known practices.

Conduit 20 is provided with nozzles 24 distributed therealong which are illustrated more in detail in FIGURES 2 and 3.

In particular, the nozzle arrangement comprises a metallic or plastic type body member 26 which may be threaded into a boss 28 fixed to conduit 20. A passage 30 extending through the nozzle permits liquid supply from the conduit when liquid is supplied thereto under pressure.

According to the present invention the body 24 of the nozzle is provided with a rubber-like cap 32 which, as will be seen in FIGURES 2 and 3 is cup-like in configuration with intersecting incisions 34 therein in the bottom wall which extends over the outer or discharge end of the nozzle so that upon a supply of liquid under pressure through passage 30, the lips formed by the incisions; said lips being indicated by dot-dash outline at 36 in FIGURE 3; will yield outwardly to permit the liquid flow from the nozzle. The cap can be of relatively soft material and substantially no resistance to fluid flow therethrough will be encountered. However, upon interruption of the flow through passage 30 the said lips 36 will fall back into place on the end of the nozzle and will positively close passage 30 so that absolutely no granular material can enter the said passage.

The body 24 of the nozzle is advantageously provided with an annular groove 38 and the rim of the cup-like cap 32 is preferably provided with an inturned lip or flange 40 which is received in groove 38. This makes for very simple quick assembling of the nozzle cap with the nozzle body but, at the same time, will tightly hold the nozzle cap on the nozzle body even when the pipe or conduit 20 rotates as is illustrated in FIGURE 1. I have found that the relatively simple arrangement disclosed in the present invention absolutely prevents the entrance of foreign matter through the nozzle and into the pipe or conduit while, at the same time, it offers substantially no resistance to liquid flow out through the nozzles. The arrangement is inexpensive and is easy to maintain and, due to the rubber-like nature of the cap 32, very little abrasion thereof occurs even when the conduit 20 rotates in bed 10.

As will be seen in FIGURES 4 and 5 the incisions formed in the bottom wall of the rubber-like cap, said cap being indicated at 32a in FIGURES 4 and 5, could be in the form of zig zag or serrated lines and these are indicated at 34a in FIGURES 4 and 5. The forming of the incisions in the aforesaid manner is of advantage when air is supplied through the nozzles because this will tend to break the air up into extremely fine bubbles so that it will distribute through the liquid being treated in the form of fine bubbles and thereby make the best possible contact with the liquid. The arrangement of FIGURES 4 and 5, while suitable for use with granular filter beds, is thus also well adapted for use with nozzles where a gas such as air, ozone or the like is to be supplied and serves to effect diffusion of the air into small bubbles, while at the same time the arrangement of FIGURES 4 and 5 closes the passages through the nozzle bodies 24a against the ingress of the liquid of solution being treated in case of interruption of the air supply which might come about on account of power failure or the like. The nozzles, in every case, are located under the level of the body of liquid being treated. The nozzle cap according to my invention not only effects diffusion of the air but will also instantaneously and positively close the nozzle passages against the ingress of the liquid or solution being treated upon the interruption of the air supply to the nozzles.

I have mentioned that the nozzles could be formed of a rubber-like material and it is possible, of course, that these nozzle caps could be formed of natural or synthetic rubber or a combination thereof or of any of several elastomeric plastics. Possible materials, in addition to natural rubber are neoprene, polyethylene, Buna-t-5 and the like.

A feature of the present invention is to be found in the intersecting incisions which permit relatively easy bending of the lips of the bottom wall of the cap so that there is no over straining of the material whereby the material in the cap does not tend to crack or tear in use. I therefore consider the intersecting arrangement of the incisions to be of importance in connection with my invention, as a single incision has a tendency to rip open.

As to sizes, the threaded nozzle shank shown is about the size of a quarter inch or three-eighths inch pipe and the bore therethrough is about three-sixteenths inch in diameter. The length of the nozzle is about an inch and one half and in outer diameter the nozzle might be on the order of an inch or more. The cap is thus an inch or more inside diameter and may be about the same over all length. The caps are thus relatively inexpensive and can readily be replaced at any time it becomes necessary.

It has been mentioned that the cap presents substantially no resistance to liquid or air flow therethrough but it will be evident that, in the case of air flow therethrough, even though the cap offers no substantial restriction thereto, the tendency of the lips of the cap is to resist by elasticity instant opening, particularly, since the pressure of the surrounding liquid is bearing thereon, and this will tend to maintain the slits relatively narrow so that the points formed by the serrations that make up the slits will be most effective for diffusing the air and breaking it up into bubbles. The passage through the slits for air will be in the form of a relatively narrow zig zag passage and the air will tend to break into several streams of fine bubbles and thus distribute itself widely through the liquid.

It is to be noted that the incisions are substantially greater in length than the diameter of the flow passage through the nozzle body so as to form lips which have substantial area so as to yield freely to fluid pressure in the nozzle while collapsing flat against the discharge end of the nozzle body upon interruption of the pressure so as positively to close said passage.

It will be understood that this invention is susceptible to modification in order to adapt it to different usages and conditions; and accordingly, it is desired to comprehend such modifications within this invention as may fall within the scope of the appended claims.

What is claimed is:

1. In combination; a nozzle having a body with a passage therethrough through which fluid is supplied in one direction to a body of flowable material surrounding the nozzle and which material is to be treated by the fluid, said passage being relatively small with respect to said body, and a rubber like cap mounted on said nozzle body and having a bottom wall extending over the discharge end of the nozzle body and provided with incision means so the lips formed by the incision means will yield outwardly from the end of the nozzle body in response to pressure within the nozzle passage to permit fluid to flow from the nozzle into said body of material while, upon interruption of said fluid flow from the nozzle passage, said lips will collapse against the end of the nozzle body and will close to prevent said flowable material from entering said nozzle passage, the entire inner surface of said cap except for the region exposed by the discharge end of said passage being in engagement with the exterior surface of the nozzle body when said lips are collapsed to support the lips against inward deflection, said incision, means extending across the discharge end of said passage and beyond at least one lateral limit of the passage a substantial distance for easy outward yielding of said lips due to pressure in said passage.

2. In combination; according to claim 1 in which said incision means comprises intersecting incisions.

3. In combination according to claim 2 in which the line of intersection of said incisions is substantially coaxial with said passage.

4. In combination according to claim 3 in which said incisions are serrated so as to diffuse the treatment fluid passing from the nozzle.

5. In combination according to claim 2 in which said nozzle body is substantially cylindrical in the region of said cap with a flat discharge end through which said passage opens, said cap having a flat bottom resting on the flat end of the nozzle body and in which bottom said incisions are formed, said cap also having a cylindrical side wall surrounding the nozzle body, and means for releasably retaining the cap on the nozzle body.

6. In combination according to claim 5 in which said last mentioned means comprises an annular groove in the periphery of said nozzle body and an annular inwardly projecting rib on the side wall of said cap extending into said groove.

References Cited

UNITED STATES PATENTS

| | | | |
|---|---|---|---|
| 1,636,314 | 7/1927 | Murray | 239—602 X |
| 2,308,476 | 1/1943 | Gerrer | 239—602 |
| 3,214,102 | 10/1965 | Meyer | 239—534 |

M. HENSON WOOD, Jr., *Primary Examiner.*

H. NATTER, *Assistant Examiner.*